April 25, 1967      A. J. JENIGEN      3,315,357
BED CUTTER
Filed Oct. 12, 1965
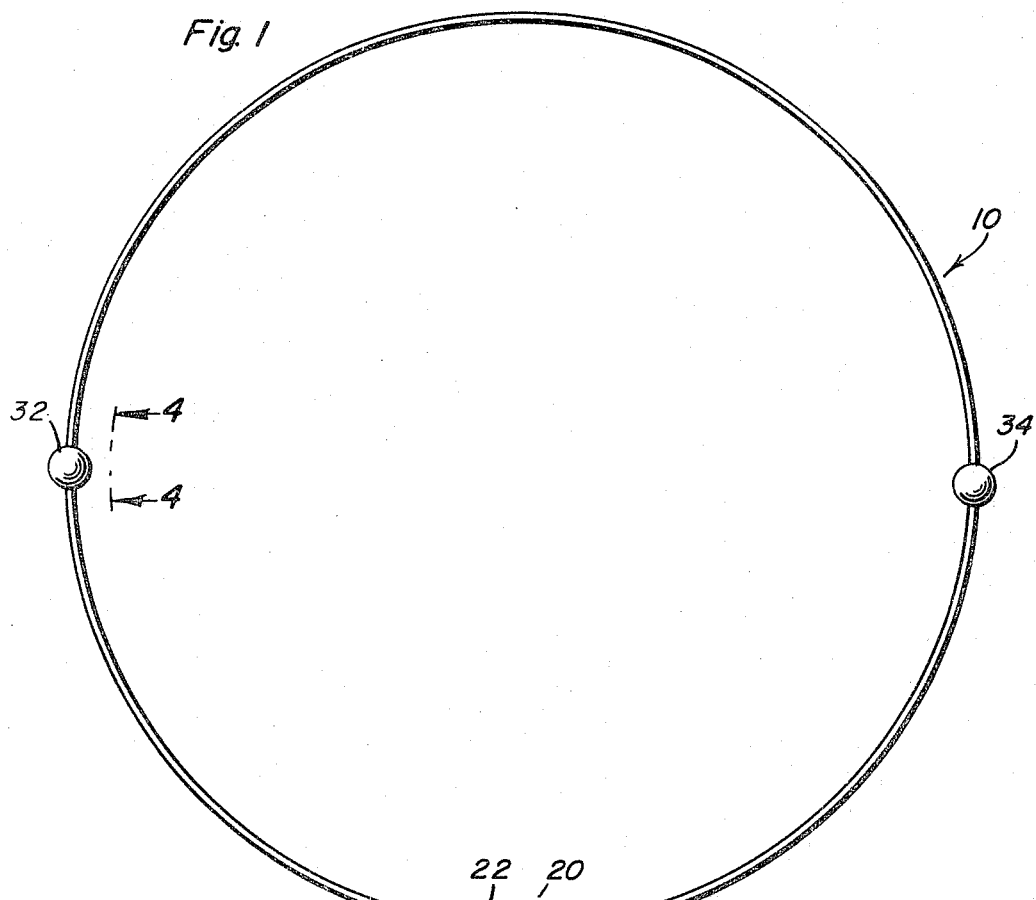
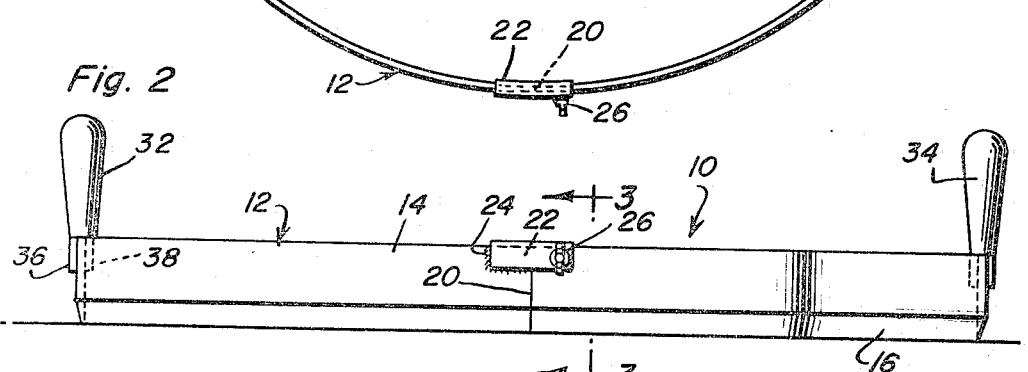
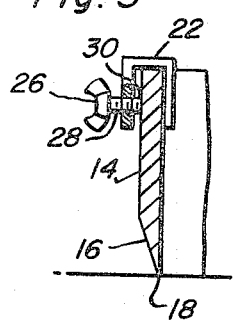
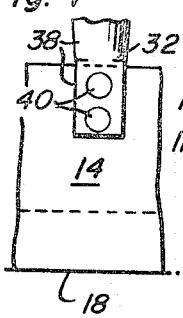
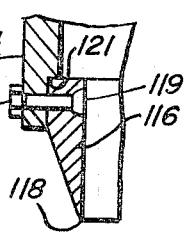
Albert J. Jenigen
INVENTOR

United States Patent Office 3,315,357
Patented Apr. 25, 1967

3,315,357
BED CUTTER
Albert J. Jenigen, Bristol, Pa., assignor of fifty percent to Richard H. Ellis, Fairless Hills, Pa.
Filed Oct. 12, 1965, Ser. No. 495,251
5 Claims. (Cl. 30—316)

This invention relates generally to cutting tools and more particularly to circular bed cutters for removing lawn growth around objects such as posts, trees or bushes or the like.

A persistent problem for gardeners is in the cutting of a tree, bush or post bed, since the tools currently in use in the prior art necessitate tediously cutting the bed with a flat or slightly curved blade, requiring a number of strokes to complete the cutting job. While there are tools in the prior art in use which have circular cutting heads for cutting around circular objects, such as sprinkler nozzle heads, these tools are useless in cutting around trees or posts as the tools comprise solid circular blades which may not be split to fit about the trees or posts and due to the height thereof cannot practicably be positioned vertically downwardly over the tree or post. Thus, it has been necessary to use a flat or slightly curved single-edge tool in cutting around the bed of a tree or post, and, if the object is an especially large one, the job can be extremely tedious and time-consuming.

Accordingly, it is an object of the present invention to provide an improved tool with which the bed about a tree or post may be cut in one cutting stroke.

Another object of the present invention is to provide a cutting tool which is generally circular in configuration and which may be split to be positioned about an object which the tool may not practicably be placed downwardly over the top of.

It is a still further object of the present invention to provide a simple yet highly effective bed cutting lawn tool device which may be readily fabricated out of inexpensive and quite available materials.

It is a still further object of the present invention to provide a bed cutting tool having a removable blade thereon which may be readily removed for being sharpened or replaced.

Basically, the tool of the instant invention comprises an elongated bar-like body of a resiliently flexible material, preferably steel, which body is generally circular in shape so as to define an endless cutting ring. The endless cutting ring is formed through a releasable interlocking of the two free ends of the body in abutting substantially coplanar relation to each other. Inasmuch as the ends are releasably interlocked, upon an unlocking thereof, the ends can be flexed outwardly relative to each other so as to enable a movement of the cutter laterally about a tree, post or the like for the formation of a cut bed border thereabout. This is particularly significant in those instances where movement of an encircling cutter outwardly over the ground supported object would be impossible, such as would be the case with trees having enlarged tops. Upon being properly positioned about the object and locked into an endless band, the ring is worked back and forth through a pair of opposed vertically extending handles so as to cut, utilizing the lower cutting edge of the body, the border desired. Under hard ground conditions, it may be necessary to physically drive the cutting edge into the ground through the use of a mallet or hammer. As such, the upper edge of the body is flat throughout the length thereof, providing a proper impact or blow receiving surface. In one modified form of the invention, the actual cutting edges can be in the nature of a blade removably mounted on the tool about the lower edge thereof.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the bed cutter tool comprising the present invention;

FIGURE 2 is a front elevational view of the tool generally corresponding to FIGURE 1;

FIGURE 3 is an enlarged vertical sectional view taken substantially on the plane of the line 3—3 of FIGURE 2;

FIGURE 4 is an enlarged partial front elevational view taken substantially on the plane of the line 4—4 of FIGURE 1; and FIGURE 5 is a vertical sectional view similar to that of FIGURE 3 illustrating a modified embodiment of the present invention.

Referring now to the drawings in greater detail, reference numeral 10 generally denotes the bed cutting tool comprising the present invention. The tool 10, as may be observed in FIGURE 1, for example, comprises a generally circular cutting ring 12 including the cutting ring body 14. The cutting ring body 14 is preferably fabricated from a metallic material such as steel, which is hardened by well known processes. In this preferred embodiment of the tool, the diameter of the cutting ring body member is 36 inches and the cutting ring body member is covered with cadmium plate to provide a pleasing appearance and protection from the environmental elements. The cutting ring body member includes a blade portion 16 which blade portion 16 constitutes a sharpened cutting edge 18 on the bottom edge thereof which is provided by tapering the body member 14 downwardly and inwardly.

Referring to FIGURES 1 and 2, it will be observed that the body member 14 is split at 20 and includes a fastening member 22 thereon, the fastening member 22 being fixed to the left hand portion of body member 14 by weld 24. The fastening member 22 is preferably fabricated of cold rolled steel and is in the shape of an inverted U. The fastening member 22 performs as a clamp for holding the adjacent edges of the body member 14 together at 20 by virtue of the setscrew 26 which extends through a threaded opening in the right hand portion of the fastening member. Of course, the setscrew is threaded as indicated at 28 in order to be received in the opening in the fastening member 22, and by virtue of the threaded portion thereof may be selectively tightened down against the body member as indicated by reference numeral 30.

Bearing in mind that the purpose of the bed cutter tool 10 is to give a clean, perfectly round cut bed for flower, tree or post beds, the operation of the tool may be explained as follows. The setscrew 26 is loosened in clamp 22 and the right hand portion of body member 14 is pulled out of the fastening member 22 to permit encirclement of the flower, tree or post. The tool 10 includes a pair of handles 32 and 34 which are preferably riveted to the body member 14 through the depending leg portions 36 and 38 by conventional rivets 40. Thus, the handles 32 and 34 are fixed in upright position and may be readily grasped by the user of the tool for the intended use and purpose thereof. After the cutting ring 12 is positioned in encirclement of the flower, tree or post bed, the right hand body portion is slipped back into fastening member 22 and the setscrew 26 tightened down, thereby effectively creating a circular cutting tool about the bed. The handles are grasped by the user and the cutting edge 18 of blade portion 16 moved against the ground. The tool 10 is then worked back and forth making a cut in the earth. As will be appreciated, if the earth is too hard for the user to force the blade therein by using the handles, a mallet or hammer may be used o drive the blade into the earth. At this time, a perfect circle will be cut about the bed and thus creeping grass and roots and the like are severed as the blade is inserted into the earth. Of course, the tool is removed from the cutting position by simply reversing the above-described procedure.

Referring now to FIGURE 5, a modified embodiment of the tool 10 is illustrated. The body member 114 is substantially similar to the body member 14; however, the blade portion 16 is removed and a separate blade portion 116 is attached thereto by a plurality of bolts 117 engaging with countersunk nuts denoted by reference numeral 119. The bolts 117 extend through the lower portion of body member 114 and the upper portion of the blade 116, thereby retaining the blade against a cut-out portion 121 in body 114, which cutout portion 121 extends completely around the inner periphery of the body member 114. Of course, the blade 116 includes cutting edge 118 thereon, and the body member 114 includes a pair of handles similar to handles 32 and 34 described above. Further, the body member 114 and the blade 116 are split and include a fastening member similar to fastening member 22 described above. Thus, it will be appreciated that the blade 116 may be removed from the body member 114 and either replaced by a new, sharpened blade or may be removed in order to be sharpened itself. However, the tool using the removable blade 116 illustrated in FIGURE 5 is otherwise used in the same manner as described with reference to the tool illustrated in FIGURES 1–4 above.

In view of the above description, it will be readily appreciated that the bed cutter tool of the present invention provides a novel and effective tool for cutting the beds around objects such as trees or bushes or posts which are either too tall or too wide to position a cutting tool downwardly over the top thereof. Further, the cutter may be fabricated in various sizes, from the 36 inch diameter indicated above to approximately 6 feet in diameter in order to provide means for cutting a bed about various size trees, bushes and the like.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A tool for cutting an endless bed border about a ground supported object, said tool comprising an elongated flat bar-like body defined by opposite terminal ends selectively locked to each other so as to form an object encircling single band, and generally parallel upper and lower elongated edges, said lower edge being in the nature of a ground cutting edge, said bar-like body being flexible and capable of flexing outwardly whereby a substantial space is defined between the two ends thereof so as to allow a lateral positioning of the body about a ground supported object, said body, in its unflexed condition, having the opposite ends thereof closely adjacent each other, generally defining the shape of the object encircling single band, said body, subsequent to a flexing and release thereof, returning to a substantially constant unflexed shape, and a pair of independent handles fixed to said body and projecting vertically therefrom at points generally diametrically opposed from each other.

2. The tool of claim 1 wherein said opposite terminal ends, when locked to each other, abut each other in a common plane generally perpendicular to the adjacent portions of the body, and locking means for locking said ends to each other, said locking means comprising an inverted generally U-shaped member, said member having one end portion fixed to one end portion of said body, said member projecting longitudinally from said one end portion of the body and defining a downwardly opening socket for the reception of the second end portion of said body coplanar with the first edge portion and means releasably fixing said second end portion in said socket.

3. The tool of claim 2 wherein said upper edge is flat throughout the length thereof and defines an impact receiving surface for the forceable driving of said body into the ground.

4. The tool of claim 3 wherein said body is generally circular in shape and defines a single ring.

5. The tool of claim 3 wherein said cutting edge is defined by a removably mounted flexible blade.

References Cited by the Examiner

UNITED STATES PATENTS

| 799,928 | 9/1905 | Nehr | 30—316 |
| 1,280,447 | 10/1918 | Gross | 39—316 |
| 1,512,875 | 10/1924 | Byam | 24—256 |
| 1,515,000 | 11/1924 | Thompson | 30—316 X |
| 2,178,710 | 11/1939 | Valiquette. | |

FOREIGN PATENTS 96,115   6/1939   Sweden.

JAMES L. JONES, Jr., *Primary Examiner.*